United States Patent
Roundy et al.

(10) Patent No.: US 10,284,564 B1
(45) Date of Patent: *May 7, 2019

(54) SYSTEMS AND METHODS FOR DYNAMICALLY VALIDATING REMOTE REQUESTS WITHIN ENTERPRISE NETWORKS

(71) Applicant: Symantec Corporation, Mountain View, CA (US)

(72) Inventors: Kevin Alejandro Roundy, El Segundo, CA (US); Christopher Gates, Culver City, CA (US); Petrus Johannes Viljoen, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/192,653

(22) Filed: Nov. 15, 2018

Related U.S. Application Data (63) Continuation of application No. 15/044,708, filed on Feb. 16, 2016, now Pat. No. 10,200,369.

(51) Int. Cl.
*H04L 29/06* (2006.01)
*H04L 29/08* (2006.01)
*H04L 29/12* (2006.01)

(52) U.S. Cl.
CPC .......... *H04L 63/10* (2013.01); *H04L 61/2007* (2013.01); *H04L 67/104* (2013.01)

(58) Field of Classification Search
CPC ............. G06F 9/45558; G06F 9/45537; G06F 12/1009; G06F 2009/45583;
(Continued)

(56) References Cited

U.S. PATENT DOCUMENTS 6,321,338 B1    11/2001   Porras et al.
8,826,426 B1    9/2014   Dubey
(Continued)

OTHER PUBLICATIONS

"Security-Enhanced Linux", https://en.wikipedia.org/wiki/Security-Enhanced_Linux, as accessed Dec. 29, 2015, Wikipedia, (Sep. 19, 2004).
(Continued)

*Primary Examiner* — Joseph P Hirl
*Assistant Examiner* — Stephen T Gundry
(74) *Attorney, Agent, or Firm* — FisherBroyles, LLP (57) ABSTRACT

The disclosed computer-implemented method for dynamically validating remote requests within enterprise networks may include (1) receiving, on a target system within an enterprise network, a request to access a portion of the target system from a remote system within the enterprise network, (2) performing a validation operation to determine whether the remote system is trustworthy to access the portion of the target system by (A) querying an enterprise security system to authorize the request from the remote system and (B) receiving, from the enterprise security system in response to the query, a notification indicating whether the remote system is trustworthy to access the portion of the target system, and then (3) determining whether to grant the request based at least in part on the notification received from the enterprise security system as part of the validation operation. Various other methods, systems, and computer-readable media are also disclosed.

18 Claims, 6 Drawing Sheets

(58) Field of Classification Search
CPC ..... G06F 2009/45595; G06F 2212/151; H04L 12/4633; H04L 45/74; H04L 45/745; H04L 63/029; H04L 63/08; H04L 63/1433; H04L 67/1097; H04L 63/1416; H04L 63/1458
See application file for complete search history.

(56) References Cited

U.S. PATENT DOCUMENTS

| | | | |
|---|---|---|---|
| 8,959,609 B1 | 2/2015 | Newstadt et al. | |
| 9,098,333 B1 | 8/2015 | Obrecht et al. | |
| 9,137,262 B2* | 9/2015 | Qureshi | G06F 21/10 |
| 9,143,529 B2* | 9/2015 | Qureshi | G06F 21/10 |
| 9,143,530 B2* | 9/2015 | Qureshi | G06F 21/10 |
| 9,183,380 B2* | 11/2015 | Qureshi | G06F 21/10 |
| 9,251,114 B1* | 2/2016 | Ancin | G06F 15/17331 |
| 9,258,316 B1 | 2/2016 | Dubey | |
| 9,286,471 B2* | 3/2016 | Qureshi | G06F 21/10 |
| 9,361,443 B2 | 6/2016 | Radhakrishnan et al. | |
| 9,361,455 B2 | 6/2016 | Abuelsaad et al. | |
| 9,378,359 B2* | 6/2016 | Qureshi | G06F 21/10 |
| 9,407,655 B2 | 8/2016 | Futty | |
| 9,413,786 B1 | 8/2016 | Boss et al. | |
| 9,420,002 B1* | 8/2016 | McGovern | H04L 63/10 |
| 9,438,618 B1 | 9/2016 | Sultan et al. | |
| 9,450,901 B1* | 9/2016 | Smullen | H04L 51/046 |
| 9,503,477 B2 | 11/2016 | May et al. | |
| 9,529,996 B2* | 12/2016 | Qureshi | G06F 21/10 |
| 9,560,030 B2 | 1/2017 | Hughes | |
| 9,602,344 B1* | 3/2017 | Iyengar | G06F 8/76 |
| 9,721,086 B2 | 8/2017 | Shear et al. | |
| 9,756,115 B2 | 9/2017 | Chan et al. | |
| 9,787,723 B2 | 10/2017 | Harmon et al. | |
| 9,807,094 B1 | 10/2017 | Liu et al. | |
| 9,813,285 B1* | 11/2017 | McGovern | G06F 21/316 |
| 9,838,398 B2 | 12/2017 | Barton et al. | |
| 9,854,063 B2 | 12/2017 | Borzycki et al. | |
| 9,876,804 B2 | 1/2018 | Dulkin et al. | |
| 9,876,815 B2 | 1/2018 | Sultan et al. | |
| 9,922,203 B2* | 3/2018 | Ancin | G06F 15/17331 |
| 9,935,960 B2* | 4/2018 | Raizada | H04L 63/10 |
| 9,948,583 B2 | 4/2018 | Smullen et al. | |
| 10,069,899 B2* | 9/2018 | Chan | H04L 67/06 |
| 10,158,605 B2* | 12/2018 | White, Jr. | H04L 63/0209 |
| 2008/0244091 A1 | 10/2008 | Moore et al. | |
| 2008/0250497 A1 | 10/2008 | Mullarkey et al. | |
| 2011/0231935 A1 | 9/2011 | Gula et al. | |
| 2012/0060207 A1 | 3/2012 | Mardikar et al. | |
| 2013/0047214 A1 | 2/2013 | Radhakrishnan et al. | |
| 2013/0047248 A1 | 2/2013 | Radhakrishnan et al. | |
| 2013/0047254 A1 | 2/2013 | Radhakrishnan et al. | |
| 2013/0097701 A1 | 4/2013 | Moyle et al. | |
| 2014/0040979 A1* | 2/2014 | Barton | H04L 63/20 726/1 |
| 2014/0129652 A1* | 5/2014 | Chan | H04L 67/06 709/206 |
| 2014/0189865 A1 | 7/2014 | Abuelsaad et al. | |
| 2014/0208386 A1 | 7/2014 | Sama | |
| 2014/0331277 A1 | 11/2014 | Frascadore et al. | |
| 2014/0380423 A1 | 12/2014 | Wong et al. | |
| 2015/0113600 A1 | 4/2015 | Dulkin et al. | |
| 2015/0172321 A1 | 6/2015 | Kirti et al. | |
| 2015/0222637 A1* | 8/2015 | Hung | G06F 21/53 726/1 |
| 2015/0237074 A1 | 8/2015 | Mardikar et al. | |
| 2015/0264084 A1 | 9/2015 | Kashyap et al. | |
| 2015/0281277 A1 | 10/2015 | May et al. | |
| 2015/0311379 A1 | 10/2015 | Chung et al. | |
| 2015/0381631 A1 | 12/2015 | Salem et al. | |
| 2016/0021117 A1 | 1/2016 | Harmon et al. | |
| 2016/0036833 A1 | 2/2016 | Ardeli et al. | |
| 2016/0063281 A1* | 3/2016 | Kahana | G06F 21/71 726/27 |
| 2016/0065608 A1 | 3/2016 | Futty | |
| 2016/0088005 A1 | 3/2016 | Sinnema | |
| 2016/0099963 A1* | 4/2016 | Mahaffey | H04L 63/0227 726/25 |
| 2016/0099972 A1* | 4/2016 | Qureshi | G06F 21/10 726/1 |
| 2016/0112451 A1 | 4/2016 | Jevans | |
| 2016/0134608 A1 | 5/2016 | Hughes | |
| 2016/0226911 A1 | 8/2016 | Boss et al. | |
| 2016/0226914 A1 | 8/2016 | Doddy et al. | |
| 2016/0275285 A1 | 9/2016 | Childress et al. | |
| 2016/0315923 A1* | 10/2016 | Riscombe-Burton | H04W 12/04 |
| 2016/0337400 A1* | 11/2016 | Gupta | H04L 63/1466 |
| 2016/0373481 A1 | 12/2016 | Sultan et al. | |
| 2016/0379211 A1* | 12/2016 | Hoyos | G06F 16/951 705/75 |
| 2016/0380977 A1* | 12/2016 | Bean | H04L 63/1408 726/12 |
| 2016/0381023 A1* | 12/2016 | Dulce | H04L 63/10 726/9 |
| 2016/0381024 A1* | 12/2016 | Zhang | H04L 63/10 726/4 |
| 2017/0024408 A1* | 1/2017 | Foley | H04L 63/1408 |
| 2017/0048170 A1* | 2/2017 | Smullen | H04L 67/322 |
| 2017/0091658 A1 | 3/2017 | Matthiesen et al. | |
| 2017/0126662 A1 | 5/2017 | Sreedhar et al. | |
| 2017/0134430 A1 | 5/2017 | Feng et al. | |
| 2017/0149784 A1* | 5/2017 | White, Jr. | H04L 63/0209 |
| 2017/0214705 A1* | 7/2017 | Gupta | G06F 17/30522 |
| 2017/0223030 A1* | 8/2017 | Merza | H04L 63/1416 |
| 2017/0251013 A1 | 8/2017 | Kirti | |
| 2017/0293763 A1 | 10/2017 | Shear et al. | |
| 2017/0295198 A1 | 10/2017 | Abuelsaad et al. | |
| 2017/0339215 A1* | 11/2017 | Chan | H04L 67/06 |
| 2017/0346834 A1 | 11/2017 | Shaikh et al. | |
| 2018/0006978 A1 | 1/2018 | Smullen et al. | |
| 2018/0077172 A1 | 3/2018 | Ardeli et al. | |
| 2018/0212904 A1* | 7/2018 | Smullen | H04L 51/02 |
| 2018/0324120 A1* | 11/2018 | Smullen | H04L 12/185 |

OTHER PUBLICATIONS

Keith Newstadt et al.; Systems and Methods for Analyzing Network Activity Over Encrypted Network Connections; U.S. Appl. No. 15/379,025, filed Dec. 14, 2016.

* cited by examiner

SYSTEMS AND METHODS FOR DYNAMICALLY VALIDATING REMOTE REQUESTS WITHIN ENTERPRISE NETWORKS

CROSS REFERENCE TO RELATED APPLICATION

This application is a continuation of U.S. application Ser. No. 15/044,708, filed on Feb. 16, 2016, the disclosure of which is incorporated, in its entirety, by this reference.

BACKGROUND

In the context of enterprise networks, security software products are often used to protect sensitive data stored on computing devices and/or prevent potentially malicious or unauthorized computing transactions. For example, a traditional security software product may run on a computing device within an enterprise network. In this example, the traditional security software product may be able to determine whether or not local requests originating on the computing device are legitimate, authorized, and/or safe. However, the same security software product may have difficulty assessing whether remote requests originating from another computing device are legitimate, authorized, and/or safe.

As an example, a computing device within an enterprise network may issue a request to launch a process on another computing device within the enterprise network. In this example, the other computing device may include a traditional security agent that decides whether to grant or deny remote requests. Unfortunately, once the request to launch the process reaches the other computing device, the traditional security agent may have little information upon which to base its decision to grant or deny the request. For example, the request may include and/or identify an Internet Protocol (IP) address and/or Media Access Control (MAC) address of the computing device. While such addresses may identify the requesting device to a certain extent, these addresses may fail to provide enough information to enable the traditional security agent to determine whether the request is legitimate, authorized, and/or safe. As a result, the traditional security agent may be unable to make a fully informed decision on whether to grant or deny the request.

The instant disclosure, therefore, identifies and addresses a need for improved systems and methods for dynamically validating remote requests within enterprise networks.

SUMMARY

As will be described in greater detail below, the instant disclosure describes various systems and methods for dynamically validating remote requests within enterprise networks. In one example, a computer-implemented method for dynamically validating remote requests within enterprise networks may include (1) receiving, on a target system within an enterprise network, a request to access a portion of the target system from a remote system, (2) performing a validation operation to determine whether the remote system is trustworthy to access the portion of the target system by (A) querying an enterprise security system to authorize the request from the remote system and (B) receiving, from the enterprise security system in response to the query, a notification indicating whether the remote system is trustworthy to access the portion of the target system, and then (3) determining whether to grant the request from the remote system based at least in part on the notification received from the enterprise security system as part of the validation operation.

Examples of the request include, without limitation, a request to launch a process on the target system, a request to access data stored on the target system, a request to write data to the target system, a request to transfer an executable to the target system, a request to transfer data from the target system to an additional device outside the enterprise network, variations or combinations of one or more of the same, and/or any other suitable request.

In one example, the method may also include obtaining, at the enterprise security system, contextual information about the request from the remote system. In this example, the method may further include determining, via the enterprise security system, whether the target system is to trust the remote system with respect to the request based at least in part on the contextual information. Additionally or alternatively, the method may include generating, by the enterprise security system, the notification indicating whether the remote system is trustworthy to access the portion of the target system.

In one example, the contextual information may identify an action requested by the remote system in connection with the request. Additionally or alternatively, the contextual information may include, represent, and/or identify supplemental data related to the action requested by the remote system in connection with the request.

In one example, the method may also include providing the enterprise security system with identification information that identifies the remote system. In this example, the identification information may include an IP address of the remote system.

In one example, the notification may include, represent, and/or identify an instruction on whether the target system is to grant the request from the remote system. Additionally or alternatively, the notification may include, represent, and/or identify information indicating whether the remote system is trustworthy to access the portion of the target system. Finally, the notification may include, represent, and/or identify information with which the target system is able to determine whether the remote system is trustworthy to access the portion of the target system.

In one example, the enterprise security system may include and/or represent a remote security server. In this example, the method may also include querying, by the target system, the remote security server such that, in response to the query, the remote security server obtains, from the remote system, contextual information about the request from the remote system and then determines whether the target system is to trust the remote system with respect to the request based at least in part on the contextual information. Additionally or alternatively, the method may include receiving, at the target system, the notification from the remote security server.

In one example, the remote system and the target system may collectively include and/or represent host systems that are able to perform direct Peer-to-Peer (P2P) communications with one another via the enterprise network. In this example, at least a portion of the enterprise security system may be running on the target system. Moreover, the method may include querying, by the target system, the portion of the enterprise security system running on the target system such that, in response to the query, the portion of the enterprise security system obtains, from the remote system by way of P2P communications, contextual information about the request from the remote system and then determines whether the target system is to trust the remote system with respect to the request based at least in part on the contextual information. Additionally or alternatively, the method may include receiving the notification from the portion of the enterprise security system running on the target system.

In one example, the method may also include determining that the remote system is trustworthy to access the portion of the target system. Additionally or alternatively, the method may include determining, due at least in part to the remote system being trustworthy, that the target system is to grant the request from the remote system.

In another example, the method may also include determining that the remote system is not trustworthy to access the portion of the target system. Additionally or alternatively, the method may include determining, due at least in part to the remote system being untrustworthy, that the target system is to deny the request from the remote system.

As another example, a system for implementing the above-described method may include (1) a request module, stored in memory, that receives, on a target system within an enterprise network, a request to access a portion of the target system from a remote system, (2) a validation module, stored in memory, that performs a validation operation to determine whether the remote system is trustworthy to access the portion of the target system by (A) querying an enterprise security system to authorize the request from the remote system and (B) receiving, from the enterprise security system in response to the query, a notification indicating whether the remote system is trustworthy to access the portion of the target system, (3) a security module, stored in memory, that determines whether to grant the request from the remote system based at least in part on the notification received from the enterprise security system as part of the validation operation, and (4) at least one physical processor that executes the request module, the validation module, and the security module.

As a further example, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, on a target system within an enterprise network, a request to access a portion of the target system from a remote system, (2) perform a validation operation to determine whether the remote system is trustworthy to access the portion of the target system by (A) querying an enterprise security system to authorize the request from the remote system and (B) receiving, from the enterprise security system in response to the query, a notification indicating whether the remote system is trustworthy to access the portion of the target system, and then (3) determine whether to grant the request from the remote system based at least in part on the notification received from the enterprise security system as part of the validation operation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for dynamically validating remote requests within enterprise networks. As will be explained in greater detail below, by querying an enterprise security system that serves as a mediator for computing transactions within an enterprise network, the various systems and methods described herein may obtain meaningful information that assists in determining in real-time whether to grant or deny remote requests for such computing transactions based at least in part on their trustworthiness. In other words, this information may enable the various systems and methods described herein to make real-time decisions as to whether computing transactions attempted within the enterprise network are trustworthy and/or potentially malicious.

This information may identify the nature of the computing transactions in question, the users operating the remote systems that issued the corresponding remote requests, the processes that issued the corresponding requests on the remote systems, the hygiene of the remote systems that issued the corresponding requests, variations or combinations of one or more of the same, and/or any other suitable information that may assist in dynamically validating remote requests within enterprise networks.

The term "remote request," as used herein, generally refers to any type or form of request that originates from one computing system within an enterprise network and targets another computing system within the enterprise network. One or more of these computing systems may include and/or represent a physical computing device. Additionally or alternatively, one or more of the computing systems may include and/or represent a virtual machine running on a physical computing device.

The term "enterprise network," as used herein, generally refers to any type or form of network that facilitates communication and/or interconnection among computing systems of a business, organization, and/or enterprise. In one example, an enterprise network may include various physical and/or virtual computing systems and resources used by an enterprise to carry out business-related tasks. However, even though all of these computing systems may be included in the enterprise network, not all of these computing systems may be fully trustworthy to perform any and all computing tasks within the enterprise network.

Figure 1:
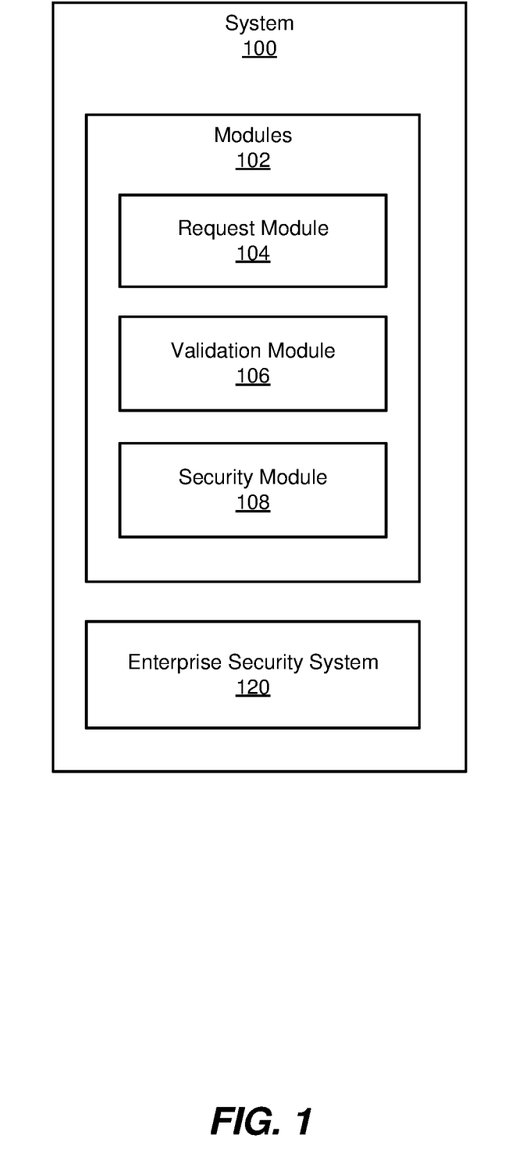
FIG. 1 is a block diagram of an exemplary system for dynamically validating remote requests within enterprise networks.
Figure 2:
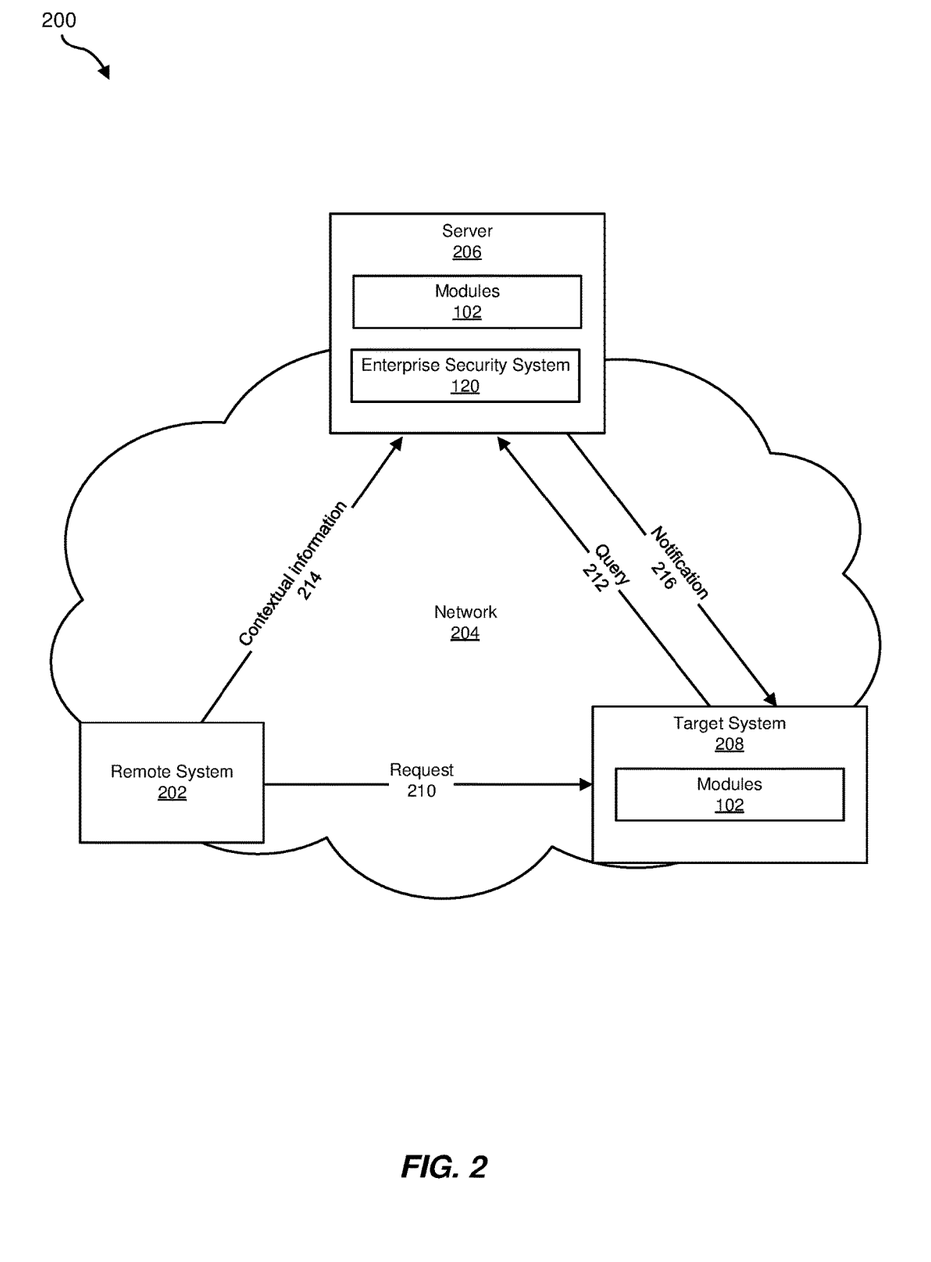
FIG. 2 is a block diagram of an additional exemplary system for dynamically validating remote requests within enterprise networks.
Figure 3:
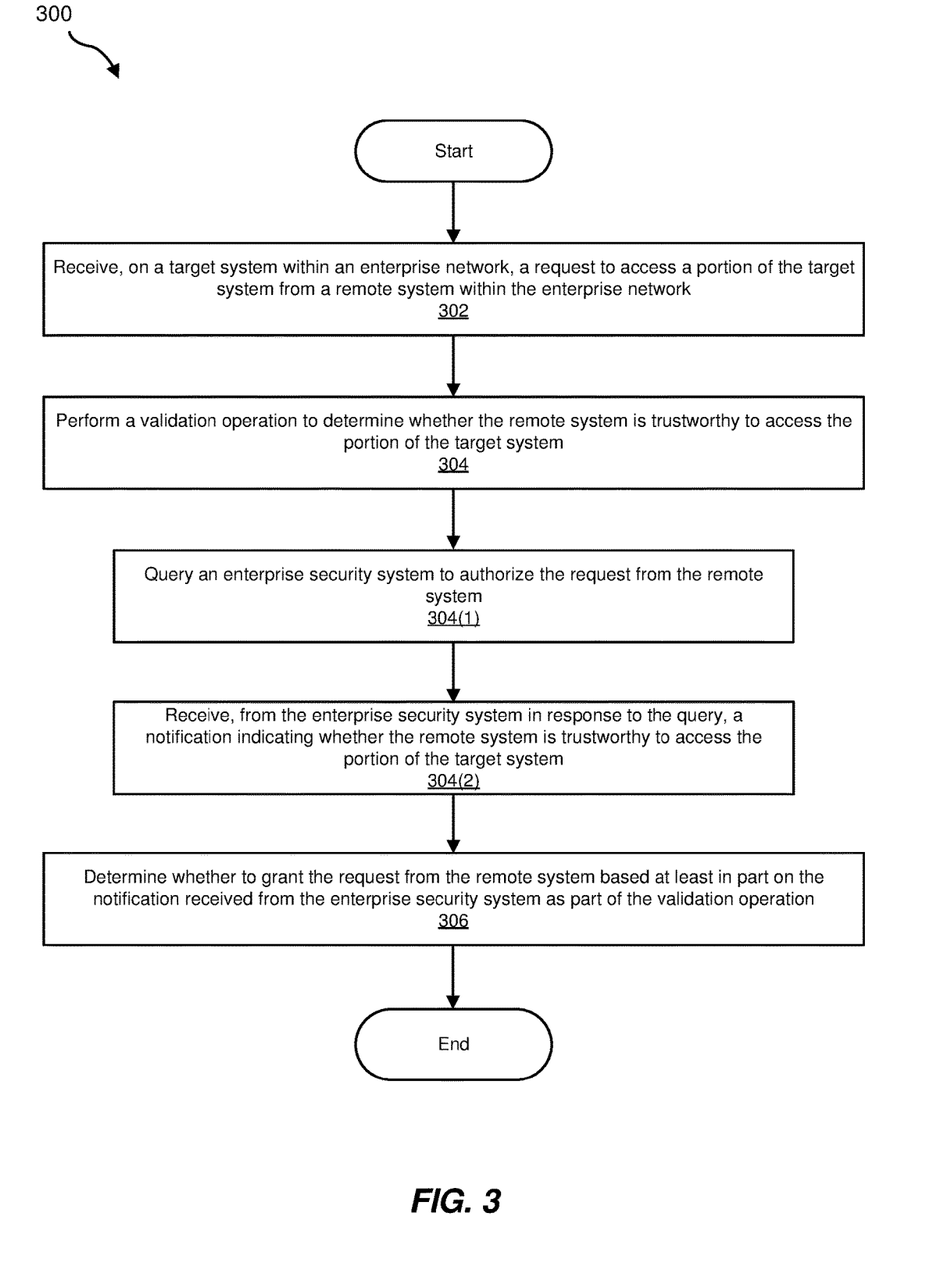
FIG. 3 is a flow diagram of an exemplary method for dynamically validating remote requests within enterprise networks.
Figure 4:
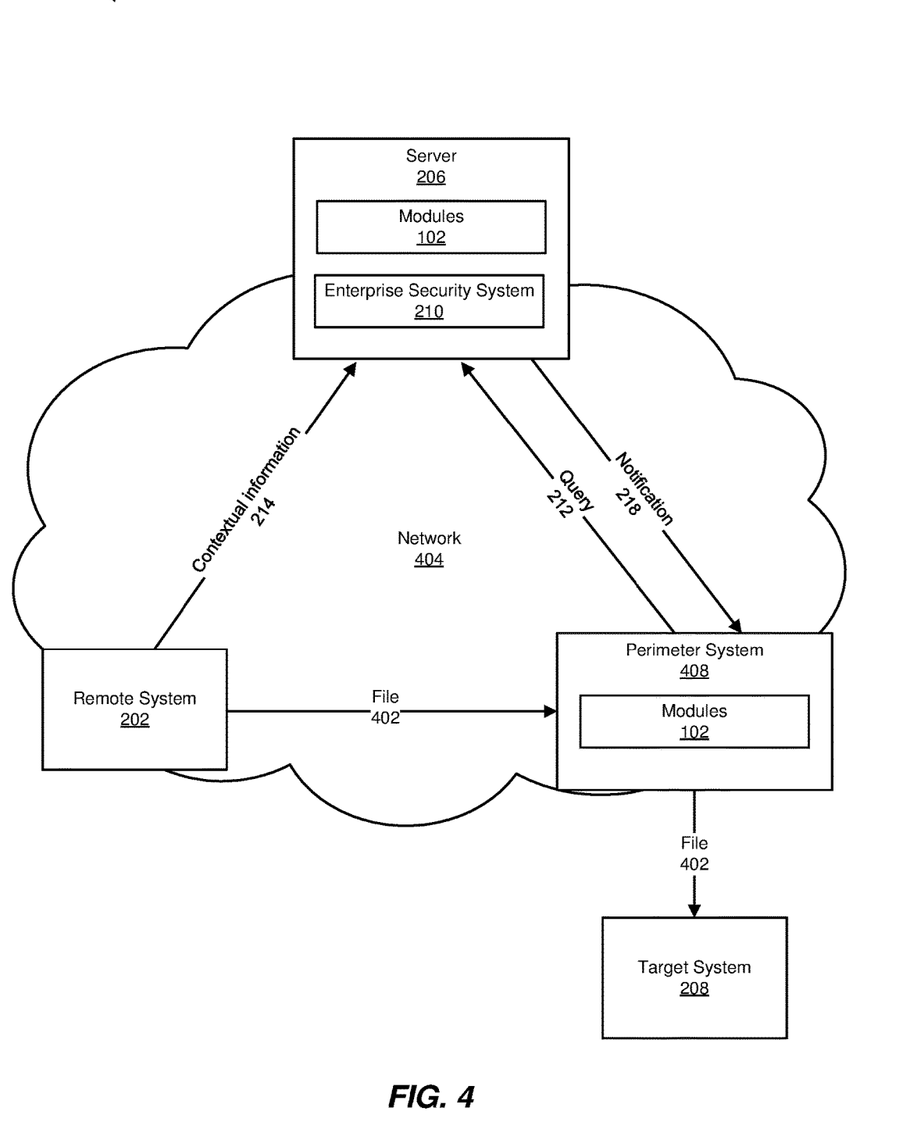
FIG. 4 is a block diagram of an additional exemplary system for dynamically validating remote requests within enterprise networks.

The following will provide, with reference to FIGS. 1, 2, and 4, detailed descriptions of exemplary systems for dynamically validating remote requests within enterprise networks. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for dynamically validating remote requests within enterprise networks. As illustrated in this figure, exemplary system 100 may include one or more modules 102 for performing one or more tasks. For example, and as will be explained in greater detail below, exemplary system 100 may include a request module 104 that receives a request to access a portion of a target system from a remote system. Exemplary system 100 may also include a validation module 106 that performs a validation operation to determine whether the remote system is trustworthy to access the portion of the target system by (1) querying an enterprise security system to authorize the request from the remote system and (2) receiving, from the enterprise security system in response to the query, a notification indicating whether the remote system is trustworthy to access the portion of the target system.

In addition, and as will be described in greater detail below, exemplary system 100 may include a security module 108 that determines whether to grant the request from the remote system based at least in part on the notification received from the enterprise security system as part of the validation operation. Although illustrated as separate elements, one or more of modules 102 in FIG. 1 may represent portions of a single module or application (such as an enterprise security system and/or a security agent or client of an enterprise security system).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., remote system 202, target system 208, and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include an enterprise security system 120 that is tasked with protecting sensitive data stored on computing systems and/ or preventing potentially malicious or unauthorized computing transactions within an enterprise network. Enterprise security system 120 generally represents any type or form of security software that protects computing systems and/or data within an enterprise network. In one example, enterprise security system 120 may include and/or represent a remote security server running within an enterprise network. Additionally or alternatively, enterprise security system 120 may include and/or represent one or more security agents and/or clients that run on computing systems within an enterprise network. Examples of enterprise security system 120 include, without limitation, Endpoint Protection and Response (EDR) security software, Advanced Threat Protection (ATP) security software, P2P security software, enterprise security software, SYMANTEC Endpoint Protection Manager (SEPM), variations or combinations of one or more of the same, and/or any other suitable enterprise security system.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 consisting of remote system 202, a target system 208, and a server 206. In this example, network 204 may include communication infrastructure that facilitates communication among remote system 202, target system 208, and server 206.

In one example, remote system 202 may be programmed with one or more of modules 102 and/or include a distributed portion (such as a security agent or client) of enterprise security system 120. Additionally or alternatively, target system 208 may be programmed with one or more of modules 102 and/or include a distributed portion (such as a security agent or client) of enterprise security system 120. Finally, server 206 may include and/or represent one or more of modules 102 and/or a portion (such as a security server) of enterprise security system 120.

In one embodiment, one or more of modules 102 from FIG. 1 may, when executed by at least one processor of remote system 202, target system 208, and/or server 206, enable remote system 202, target system 208, and/or server 206 to dynamically validate remote requests within enterprise networks. For example, and as will be described in greater detail below, one or more of modules 102 may cause remote system 202, target system 208, and/or server 206 to (1) receive, on target system 208 within network 204, a request 210 to access a portion of target system 208 from remote system 202 within enterprise network 204, (2) perform a validation operation to determine whether remote system 202 is trustworthy to access the portion of target system 208 by (A) querying enterprise security system 120 to authorize request 210 from remote system 202 and (B) receiving, from enterprise security system 120 in response to query 212, a notification 216 indicating whether remote system 202 is trustworthy to access the portion of target system 208, and then (3) determine whether to grant request 210 from remote system 202 based at least in part on notification 216 received from enterprise security system 120 as part of the validation operation.

Remote system 202 and target system 208 each generally represent any type or form of physical computing device and/or virtual machine capable of reading computer-executable instructions. Examples of remote system 202 and target system 208 include, without limitation, laptops, tablets, desktops, servers, cellular phones, Personal Digital Assistants (PDAs), multimedia players, embedded systems, wearable devices (e.g., smart watches, smart glasses, etc.), gaming consoles, virtual machines and/or hosts running on physical computing devices, variations or combinations of one or more of the same, exemplary computing system 510 in FIG. 5, and/or any other suitable computing system within network 204. Although FIG. 2 illustrates remote system 202 as being included in network 204, remote system 202 may alternatively be excluded from network 204 and/or operate external to and/or remote from network 204.

Server 206 generally represents any type or form of physical computing device and/or virtual machine capable of facilitating dynamic validation of remote requests within enterprise networks. Examples of server 206 include, without limitation, security servers, web servers, network servers, application servers, and/or database servers configured to run certain software applications and/or provide various security, web, processing, and/or database services. Although illustrated as a single element in FIG. 2, server 206 may alternatively include and/or represent multiple servers running within exemplary system 200.

Network 204 generally represents any medium or architecture capable of facilitating communication or data transfer among computing systems. Examples of network 204 include, without limitation, an enterprise network, an intranet, a private network, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless and/or wired connections.

FIG. 3 is a flow diagram of an exemplary computer-implemented method 300 for dynamically validating remote requests within enterprise networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may receive, on a target system within an enterprise network, a request to access a portion of the target system from a remote system within the enterprise network. For example, request module 104 may, as part of target system 208 within network 204 in FIG. 2, receive request 210 from remote system 202. In this example, request 210 may be directed to accessing a portion of target system 208. In one example, remote system 202 may be included in network 204. In another example, remote system may communicate with network 204 but be operating outside of network 204.

Examples of request 210 include, without limitation, a request to launch a process on target system 208, a request to access data stored on target system 208, a request to write data to target system 208, a request to transfer an executable to target system 208, a request to transfer data from target system 208 to an additional device (not illustrated in FIG. 2) outside network 204, a request to establish a connection with an additional device (not illustrated in FIG. 2) outside network 204 by way of target system 208, variations or combinations of one or more of the same, and/or any other suitable request.

In this context, the portion of target system 208 may include and/or represent a variety of different components of target system 208. Examples of such components include, without limitation, processes installed on target system 208, files and/or data stored on target system 208, communication ports of target system 208, memory locations on target system 208, variations or combinations of one or more of the same, and/or any other suitable components of target system 208.

The systems described herein may perform step 302 in a variety of ways. In some examples, request module 104 may receive request 210 as part of an attempt by remote system 202 to initiate a computing transaction with target system 208. For example, remote system 202 may issue request 210 in an attempt to initiate a computing transaction with target system 208. In this example, request 210 may be created and/or sent by a specific process running on remote system 202. Additionally or alternatively, request 210 may be created and/or sent in response to user input directing remote system 202 to initiate the computing transaction. As request 210 reaches target system 208, request module 104 may receive request 210.

In some examples, request 210 may include, represent, and/or amount to an attempt to perform an action in connection with target system 208. For example, request module 104 may detect an attempt by remote system 202 to launch a process (such as an executable, application, and/or script) on target system 208. In another example, request module 104 may detect an attempt by remote system 202 to move, extract, and/or exfiltrate data stored on target system 208 (using, e.g., WINDOWS REMOTE MANAGEMENT (WINRM), WINDOWS MANAGEMENT INSTRUMENTATION (WMI), and/or PSEXEC). In a further example, request module 104 may detect an attempt by remote system 202 to modify and/or write data to target system 208. In an additional example, request module 104 may detect an attempt by remote system 202 to transfer an executable to target system 208.

In a certain example, request module 104 may detect an attempt by remote system 202 to transfer data from target system 208 to an additional device (not illustrated in FIG. 2) outside network 204. Additionally or alternatively, request module 104 may detect an attempt by remote system 202 to establish a connection with an additional device (not illustrated in FIG. 2) outside network 204 by way of target system 208.

Returning to FIG. 3, at step 304 one or more of the systems described herein may perform a validation operation to determine whether the remote system is trustworthy to access the portion of the target system. For example, validation module 106 may, as part of target system 208 and/or server 206 in FIG. 2, perform a validation operation to determine whether remote system 202 is trustworthy to access the portion of target system 208. In other words, validation module 106 may attempt to determine whether remote system 202 should be trusted to access the portion of target system 208.

As illustrated in FIG. 3, validation module 106 may perform the validation operation by way of certain sub-steps. For example, at sub-step 304(1) in FIG. 3, validation module 106 may, as part of target system 208 and/or server 206 in FIG. 2, query enterprise security system 120 to authorize request 210 from remote system 202. Query 212 may vary according to certain policy considerations implicated by the validation operation. Additionally or alternatively, query 212 may request certain specific information that facilitates assessing the trustworthiness of request 210 and/or remote system 202.

Continuing with this example, at sub-step 304(2) in FIG. 3, validation module 106 may, as part of target system 208 and/or server 206, receive notification 216 from enterprise security system 120 in response to query 212. Notification 216 may indicate in one way or another whether remote system 202 is trustworthy to access the portion of target system 208.

The systems described herein may perform step 304 and sub-steps 304(1) and 304(2) in a variety of ways. In some examples, validation module 106 may perform the validation operation based at least in part on the trustworthiness and/or hygiene of remote system 202. Additionally or alternatively, validation module 106 may perform the validation operation based at least in part on the trustworthiness and/or hygiene of the process (such as an executable, application, and/or script) that created and/or sent request 210 on remote system 202. Additionally or alternatively, validation module 106 may perform the validation operation based at least in part on the trustworthiness and/or computing behavior or history of the user operating remote system 202.

In one example, validation module 106 may send query 212 to enterprise security system 120 running on server 206. In this example, query 212 may include and/or identify the IP address and/or MAC address of remote system 202 in connection with request 210 and/or the IP address and/or MAC address of target system 208 in an effort to identify the specific computing transaction in question. Query 212 may essentially prompt enterprise security system 120 to assess whether remote system 202 should be trusted to access the portion of target system 208 and/or perform the action implicated by request 210.

As query 212 reaches server 206, enterprise security system 120 may obtain and/or identify contextual information 214 about request 210 from remote system 202. Contextual information 214 may identify, without limitation, any actions or transactions initiated in connection with request 210, any supplemental data related to actions initiated in connection with request 210, the trustworthiness and/or hygiene of remote system 202, the process that issued request 210 on remote system 202, the trustworthiness and/or hygiene of the process that issued request 210 on remote system 202, the user operating remote system 202, the trustworthiness and/or computing behavior or history of the user operating remote system 202, security logs of remote system 202, variations or combinations of one or more of the same, and/or any other suitable contextual information that may provide certain context to request 210 and/or help facilitate a determination as to whether target system 208 should trust remote system 202 to perform the action implicated by request 210.

In one example, remote system 202 may send contextual information 214 to enterprise security system 120 prior to query 212 reaching server 206. For example, remote system 202 may send contextual information 214 at approximately the same time as request 210 is issued to target system 208. As a result, enterprise security system 120 may have immediate access to contextual information 214 to facilitate completing the validation operation upon receiving query 212.

In another example, remote system 202 may send contextual information 214 to enterprise security system 120 in response to a request (not necessarily illustrated in FIG. 2) for such information from server 206. For example, enterprise security system 120 may direct server 206 to query remote system 202 for contextual information about request 210. In response, remote system 202 may send contextual information 214 to server 206 to facilitate completing the validation operation.

Additionally or alternatively, enterprise security system 120 may obtain and/or identify contextual information about request 210 and/or remote system 202 from an additional computing system (not necessarily illustrated in FIG. 2 or 4). In one example, this additional computing system may be included in network 204. In another example, this additional computing system may communicate with enterprise security system 120 but be operating outside of network 204.

In some examples, enterprise security system 120 may assess and/or determine whether remote system 202 is trustworthy to access the portion of target system 208 in a variety of ways. For example, enterprise security system 120 may analyze contextual information 214 obtained from remote system 202 and/or any other contextual information about request 210 and/or remote system 202. In this example, enterprise security system 120 may take into account any particular actions implicated by request 210 with respect to target system 208, the trustworthiness and/or hygiene of remote system 202, the trustworthiness and/or hygiene of the process that issued request 210 on remote system 202, the trustworthiness and/or computing behavior or history of the user operating remote system 202, variations or combinations of one or more of the same, and/or any other factors that may indicate and/or influence whether target system 208 should grant or deny request 210.

In some examples, enterprise security system 120 may determine that contextual information 214 obtained from remote system 202 is insufficient to make an informed decision as to the trustworthiness of remote system 202. In such examples, enterprise security system 120 may query an additional computing system (not necessarily illustrated in FIG. 2 or 4) for additional contextual information in an attempt to supplement and/or augment contextual information 214. In one example, this additional computing system may be able to provide such additional contextual information to enterprise security system 120 in response to the query. In another example, this additional computing system may need to query a further computing system for the additional contextual information. This process of querying more computing systems may continue in a recursive way until reaching a system capable of providing such contextual information back to enterprise security system 120.

Upon determining whether target system 208 is to trust remote system 202 with respect to request 210, enterprise security system 120 may generate notification 216 indicating whether remote system 202 is trustworthy to access the portion of target system 208. In one example, notification 216 may include an instruction on whether target system 208 is to grant request 210 from remote system 202. Additionally or alternatively, notification 216 may include information indicating whether remote system 202 is trustworthy to access the portion of the target system 208. In another example, notification 216 may include information with which target system 208 is able to determine whether remote system 202 is trustworthy to access the portion of target system 208.

In one example, enterprise security system 120 may send notification 216 to target system 208. As notification 216 reaches target system 208, validation module 106 may detect and/or receive notification 216 as part of the validation operation. As will be described in greater detail below, security module 108 may then determine whether to grant or deny request 210 based at least in part on notification 216.

Additionally or alternatively, validation module 106 may determine that notification 216 is unsatisfactory and/or incomplete. As a result, validation module 106 may request enterprise security system 120 to query an additional computing system (not necessarily illustrated in FIG. 2 or 4) for additional contextual information in an attempt to supplement and/or augment contextual information 214. With this additional contextual information, enterprise security system 120 may be able to update notification 216 and/or complete its assessment of whether target system 208 is to trust remote system 202.

In some examples, enterprise security system 120 may be able to assess whether target system 208 is to trust remote system 202 and/or generate notification 216 without the need for any contextual information from remote system 202. In these examples, enterprise security system 120 may essentially "short-circuit" the validation operation to complete the assessment even without obtaining any contextual information from remote system 202. In one example, enterprise security system 120 may have enough contextual information onboard to complete the assessment. In the event that remote system 202 is unable to provide such contextual information to enterprise security system 120 for one reason or another, enterprise security system 120 may be able to obtain certain contextual information that potentially facilitates completion of the assessment from additional computing systems (such as whitelisted machines).

As a specific example, remote system 202 may initiate a transfer of an executable to target system 208. In this example, request module 104 may, as part of target system 208, detect the initiation of this transfer from remote system 202 to target system 208. In connection with this transfer, validation module 106 may, as part of target system 208, identify the IP address of remote system 202 and attempt to validate the transfer based at least in part on the IP address of remote system 202. For example, validation module 106 may perform a validation operation to determine whether remote system 202 is trustworthy to transfer an executable to target system 208 in this way. As part of this validation operation, validation module 106 may query enterprise security system 120 running on server 206 to authorize the legitimacy of the transfer based at least in part on the IP address of remote system 202.

In this example, validation module 106 may be aware that a device with that particular IP address is attempting to perform a certain action on target system 208. However, validation module 106 may be unaware that this action amounts to a transfer of an executable. In other words, validation module 106 may have little information regarding the nature of the remote request initiated by remote system 202. For example, validation module 106 may identify the IP address and/or MAC address of remote system 202 but have nothing indicating that the remote request is directed to transferring an executable to target system 208.

Enterprise security system 120 may obtain contextual information 214 regarding the remote request from remote system 202. In this example, contextual information 214 may indicate that the remote request is directed to transferring an executable to target system 208, the name and/or identify of the executable, the name and/or identity of the user operating remote system 202, the name and/or identity of the process that initiated the transfer from remote system 202, variations or combinations of one or more of the same, and/or any other suitable contextual information. In addition, enterprise security system 120 may identify additional contextual information about the remote request on server 206 and/or from another computing device not necessarily illustrated in FIG. 2. For example, enterprise security system 120 may identify the trustworthiness and/or hygiene of remote system 202, the last time that remote system 202 was infected, the trustworthiness and/or hygiene of the process that initiated the transfer from remote system 202, the trustworthiness and/or hygiene of the executable, the trustworthiness and/or computing behavior or history of the user operating remote system 202, variations or combinations of one or more of the same, and/or any other suitable contextual information.

Continuing with this example, enterprise security system 120 may determine, based on its analysis of contextual information 214, that the transfer of the executable appears to be safe, valid, and/or legitimate. In other words, enterprise security system 120 may determine that remote system 202 is trustworthy to transfer the executable to target system 208. In one example, enterprise security system 120 may arrive at this determination by identifying remote system 202, the process that initiated the transfer from remote system 202, the executable, and/or the user operating remote system 202 on a whitelist. In other words, enterprise security system 120 may determine that at least one of these components related to the remote request is whitelisted, trusted, and/or protected within network 204. Upon determining that the transfer appears to be safe, valid, and/or legitimate, enterprise security system 120 may notify target system 208 of the same to enable target system 208 to allow the transfer with confidence.

As another specific example 400, as shown in FIG. 4, remote system 202 may initiate a transfer of a file 402 in FIG. 4 to target system 208 by way of perimeter system 408 in FIG. 4. In this example, target system 208 in FIG. 4 may represent a physical device that is outside network 404. Perimeter system 408 generally represents any type or form of physical computing device and/or virtual machine capable of reading computer-executable instructions. Examples of perimeter system 408 include, without limitation, laptops, tablets, desktops, servers, cellular phones, PDAs multimedia players, embedded systems, wearable devices, gaming consoles, virtual machines and/or hosts running on physical computing devices, variations or combinations of one or more of the same, exemplary computing system 510 in FIG. 5, and/or any other suitable system.

In connection with this transfer, validation module 106 may, as part of perimeter system 408, identify the IP address of remote system 202 and attempt to validate the transfer based at least in part on the IP address of remote system 202. For example, validation module 106 may perform a validation operation to determine whether remote system 202 is trustworthy to transfer file 402 to target system 208 in this way. As part of this validation operation, validation module 106 may query enterprise security system 120 running on server 206 to authorize the legitimacy of the transfer based at least in part on the IP address of remote system 202.

In this example, validation module 106 may be aware that a device with that particular IP address is attempting to perform a certain action by way of perimeter system 408. However, validation module 106 may be unaware that this action amounts to a transfer of file 402 to target system 208. In other words, validation module 106 may have little information regarding the nature of the remote request initiated by remote system 202. For example, validation module 106 may identify the IP address and/or MAC address of remote system 202 but have nothing indicating that the remote request is directed to transferring file 402 outside of the enterprise network by way of perimeter system 408.

Enterprise security system 120 may obtain contextual information 214 regarding the remote request from remote system 202. In this example, contextual information 214 may indicate that the remote request is directed to transferring file 402 to target system 208 by way or perimeter system 408, the name and/or identify of file 402, the name and/or identity of the user operating remote system 202, the name and/or identity of the process that initiated the transfer from remote system 202, variations or combinations of one or more of the same, and/or any other suitable contextual information. In addition, enterprise security system 120 may identify additional contextual information about the remote request on server 206 and/or from another computing device not necessarily illustrated in FIG. 2. For example, enterprise security system 120 may identify the trustworthiness and/or hygiene of remote system 202, the last time that remote system 202 was infected, the trustworthiness and/or hygiene of the process that initiated the transfer from remote system 202, the trustworthiness and/or hygiene of file 402, the sensitivity level of file 402, the trustworthiness and/or computing behavior or history of the user operating remote system 202, variations or combinations of one or more of the same, and/or any other suitable contextual information.

Continuing with this example, enterprise security system 120 may determine, based on its analysis of contextual information 214, that the transfer of the executable appears to be unsafe, invalid, and/or illegitimate. In other words, enterprise security system 120 may determine that remote system 202 is not trustworthy to transfer file 402 to target system 208. In one example, enterprise security system 120 may arrive at this determination by identifying remote system 202, the process that initiated the transfer from remote system 202, file 402, and/or the user operating remote system 202 on a list of questionable, suspicious, and/or sensitive components. In other words, enterprise security system 120 may determine that at least one of these components related to the remote request is blacklisted, greylisted, classified, and/or sensitive within network 204. Upon determining that the transfer appears to be unsafe, invalid, and/or illegitimate, enterprise security system 120 may notify perimeter system 408 of the same to prevent perimeter system 408 from forwarding file 402 to target system 208 outside of the enterprise network.

Returning to FIG. 3, at step 306 one or more of the systems described herein may determine whether to grant the request from the remote system based at least in part on the notification received from the enterprise security system as part of the validation operation. For example, security module 108 may, as part of target system 208 and/or server 206 in FIG. 2, determine whether to grant or deny request 210 from remote system 202 based at least in part on notification 216 received from enterprise security system 120.

The systems described herein may perform step 306 in a variety of ways. In some examples, security module 108 may decide to grant request 210 based at least in part on notification 216. For example, notification 216 may indicate that remote system 202, the process that initiated request 210 on remote system 202, and/or the user operating remote system 202 are trustworthy. In this example, security module 108 may determine that target system 208 is to grant request 210 since one or more of these components are trustworthy.

In other examples, security module 108 may decide to deny request 210 based at least in part on notification 216. For example, notification 216 may indicate that remote system 202, the process that initiated request 210 on remote system 202, and/or the user operating remote system 202 are untrustworthy and/or unvindicated. Additionally or alternatively, notification 216 may indicate that the trustworthiness of one or more of these components is unknown and/or indefinite. As a result, security module 108 may determine that target system 208 is to deny request 210.

In one example, security module 108 may identify, within notification 216, an instruction indicating whether target system 208 is to grant or deny request 210 from remote system 202. In this example, security module 108 may determine whether to grant or deny request 210 based at least in part on this instruction included in notification 216.

In one example, security module 108 may identify, within notification 216, information indicating whether remote system 202 is trustworthy to access the portion of the target system 208. In this example, security module 108 may determine whether to grant or deny request 210 based at least in part on this information included in notification 216.

In one example, security module 108 may identify, within notification 216, information with which target system 208 is able to determine whether remote system 202 is trustworthy to access the portion of target system 208. For example, this information may include a trustworthiness score that corresponds to remote system 202 and/or request 210. In this example, security module 108 may decide whether the trustworthiness score is above a trustworthiness threshold. In the event that the trustworthiness score is above the trustworthiness threshold, security module 108 may decide to grant request 210. However, in the event that the trustworthiness score is below the trustworthiness threshold, security module 108 may decide to deny and/or block request 210.

In some examples, validation module 106 may complete the validation operation after certain harm has occurred with respect to target system 208 and/or network 204. In these examples, security module 108 may direct target system 208 to initiate certain automated-remediation actions to address and/or remedy the harm in one way or another. Additionally or alternatively, enterprise security system 120 may direct server 206 to initiate certain automated-remediation actions to address and/or remedy the harm in one way or another. In the event that such automated-remediation actions are unavailable, the user of target system 208 may supply user input that directs target system 208 to address and/or remedy the harm in one way or another.

Although FIGS. 2 and 4 illustrate specific configurations of enterprise networks capable of implementing the systems and methods described herein, additional and/or alternative configurations of enterprise networks may also implement these systems and methods. For example, in one embodiment, an enterprise network may include remote system 202, target system 208, and server 206. In addition, the enterprise network may include an intermediary system (not illustrated in FIG. 2 or 4) that resides and/or sits between remote system 202 and target system 208.

In this embodiment, remote system 202 may send a remote request to the intermediary system. The remote request may be directed to performing one or more actions on and/or computing transactions with target system 208. Upon receiving the remote request, the intermediary system may perform the validation operation to determine whether remote system 202 should be trusted with respect to the remote request. In other words, this validation operation may enable the intermediary system to determine whether remote system 202 is allowed to perform the actions on and/or computing transactions with target system 208.

In another embodiment, the validation operation may rely only on remote system 202 and target system 208, thus excluding and/or avoiding interaction with any remote servers (such as server 206 in FIGS. 2 and 4). For example, in this embodiment, an enterprise network may include remote system 202 and target system 208. Remote system 202 may send a remote request to the target system 208. The remote request may be directed to performing one or more actions on and/or computing transactions with target system 208.

Upon receiving the remote request, target system 208 may perform the validation operation directly with remote system 202 to determine whether remote system 202 should be trusted with respect to the remote request. For example, remote system 202 and target system 208 may collectively represent EDR-enabled host systems (whether physical and/or virtual) that communicate with one another within the enterprise network by way of P2P communications. In this example, remote system 202 and target system 208 may each include an EDR agent and/or client and exchange messages (such as requests and/or responses) with P2P communications via a communication protocol that ensures the trustworthiness of such messages and/or protects the integrity of such messages. Target system 208 may perform the validation operation by querying remote system 202 for contextual information 214.

Continuing with this example, target system 208 may complete the validation operation on its own (without involving a remote security server) based at least in part on contextual information 214 obtained from remote system 202. Target system 208 may then determine whether to grant or deny the remote request based at least in part on the outcome of the validation operation.

The systems and methods described herein may be implemented by and/or deployed in a variety of contexts and/or security technologies. Examples of such contexts and/or security technologies include, without limitation, Data Loss Prevention (DLP) solutions, exfiltration prevention solutions, lateral data movement decision-making solutions, real-time access decision-making solutions, antimalware solutions, variations or combinations of one or more of the same, and/or any other suitable contexts and/or security technologies.

As explained above in connection with FIGS. 1-4, an enterprise network may include a remote system, a target system, and a remote ATP server. In one example, the remote system and the target system may each include an EDR agent that coordinates security efforts and/or measures with the ATP server. In the event that the remote system issues a remote request directed to moving data to or from the target system and/or launching a process on the target system, the EDR agent running on the target system may initiate a validation operation to determine whether to grant or deny the remote request. For example, this EDR agent may query the ATP server for a determination as to the trustworthiness of the remote system and/or the remote request itself.

Upon receiving the query, the ATP server may assess the remote system and/or the remote request itself based at least in part on contextual information obtained from the remote system. For example, the EDR agent running on the remote system may send contextual information about the remote request to the ATP server near the same time as the remote request is issued to the target system. Based on this contextual information about the remote request and/or information about the remote system that issued the remote request, the ATP server may be able to formulate a fairly accurate determination as to the trustworthiness of the remote system and/or the remote request. The ATP server may then notify the EDR agent running on the target system of the determination formulated as to the trustworthiness of the remote system and/or the remote request. Using this notification from the ATP server, the EDR agent running on the target system may decide whether to grant or deny the remote request.

Figure 5:
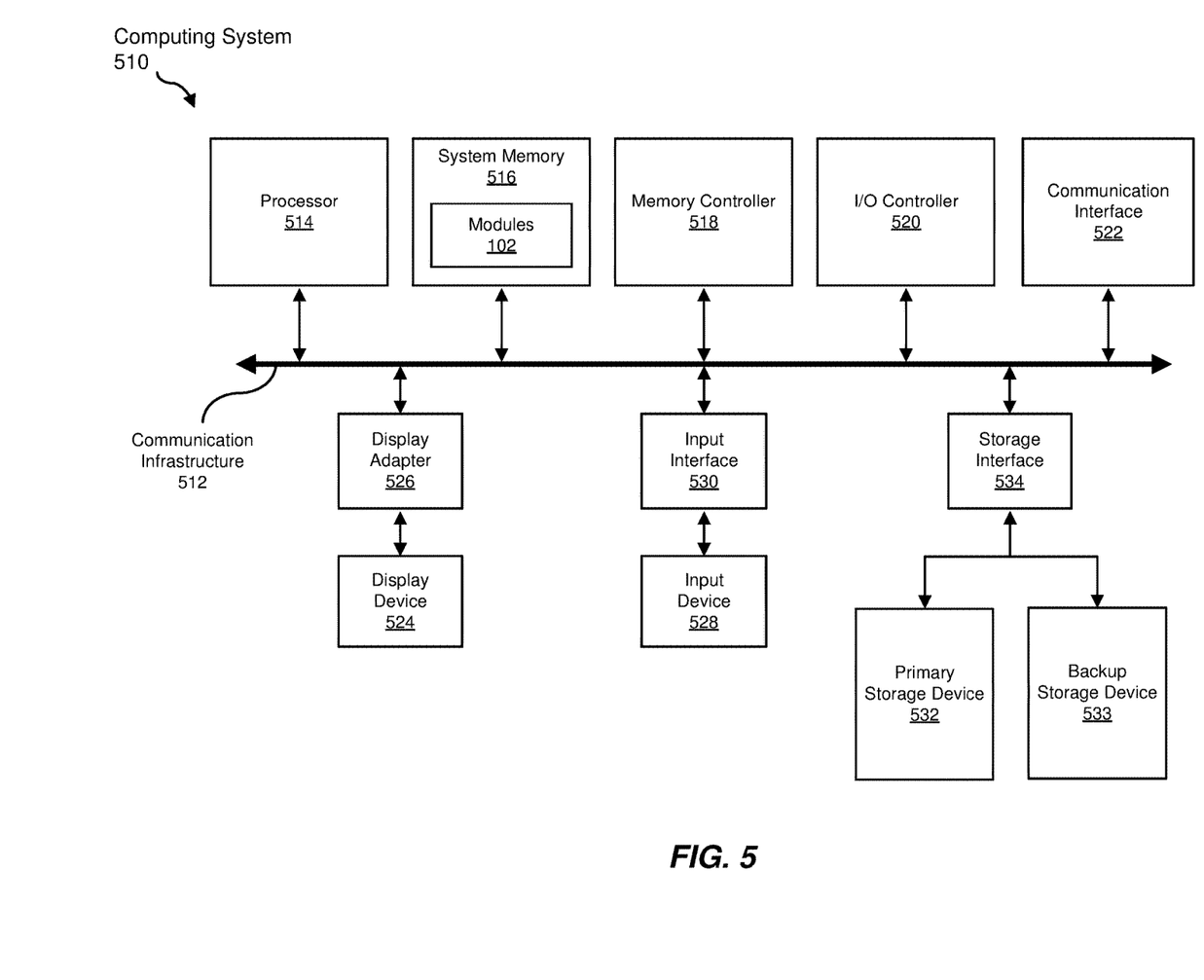
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, and/or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, and/or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, and/or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, and/or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
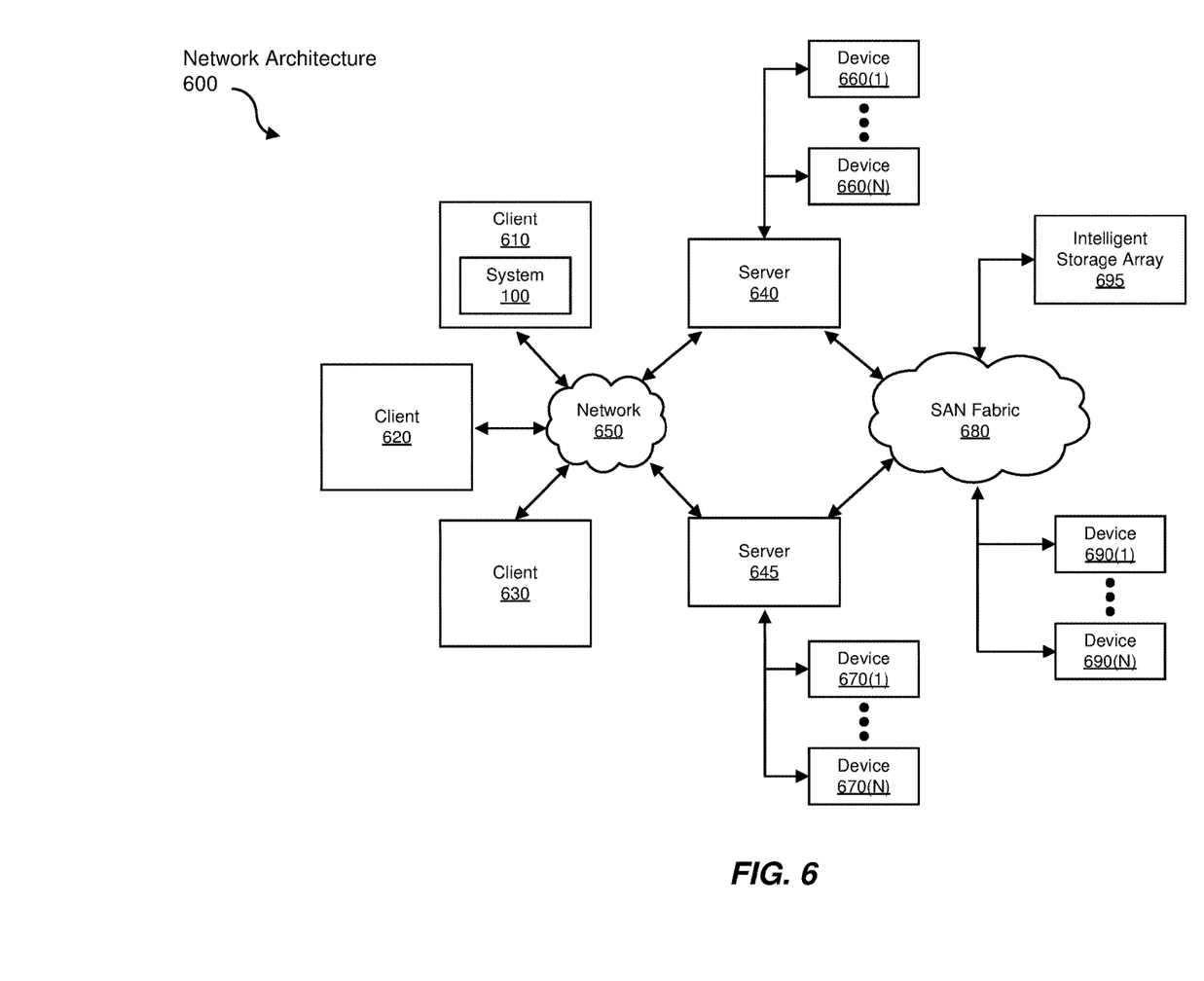
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet and/or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, and/or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for dynamically validating remote requests within enterprise networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment and/or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for dynamically validating a remote request within an enterprise network including a target system and a remote system, at least a portion of the method being performed by a computing device comprising at least one processor, the method comprising:
   receiving, by the target system and from the remote system, the remote request for access to a portion of the target system, the target system and the remote system performing direct Peer-to-Peer (P2P) communications with one another within the enterprise network;
   performing, by the target system directly with the remote system, a validation operation to determine whether the remote system is trustworthy to access the portion of the target system, the validation operation comprising:
      querying, by the target system, the remote system for contextual information about the remote system; and
      in response to the query, receiving, by the target system and from the remote system, the contextual information;

determining, by the target system, a trustworthiness of the remote request based at least in part on the received contextual information; and based on determining that the remote request is trusted, granting, by the target system and to the remote system, access to the portion of the target system.

2. The method of claim 1, wherein the target system and the remote system are Endpoint Protection and Response enabled (EDR-enabled) host systems.

3. The method of claim 2, wherein the target system includes an EDR agent.

4. The method of claim 3, wherein determining, by the target system, the trustworthiness of the remote request includes the target system utilizing the EDR agent.

5. The method of claim 1,
further comprising determining, by the target system, a trustworthiness of the remote system based at least in part on the received contextual information; and
wherein granting access to the portion of the target system is further based on determining that the remote system is trusted.

6. The method of claim 1, wherein the contextual information identifies an action requested by the remote system in connection with the remote request, and supplemental data related to the action requested by the remote system in connection with the remote request.

7. The method of claim 1, wherein the remote request comprises at least one of:
a request to launch a process on the target system;
a request to access data stored on the target system;
a request to write data to the target system;
a request to transfer an executable to the target system; or
a request to transfer data from the target system to an additional device outside the enterprise network.

8. The method of claim 1, further comprising, based on determining, by the target system, that the remote request is not trusted, not granting, by the target system and to the remote system, access to the portion of the target system.

9. A system for dynamically validating a remote request within an enterprise network that includes a target system and a remote system, the system comprising:
a request module, stored in memory in the target system, that receives from the remote system the remote request for access to a portion of the target system, the target system and the remote system performing direct Peer-to-Peer (P2P) communications with one another within the enterprise network;
a validation module, stored in the memory in the target system, that performs a validation operation to determine whether the remote system is trustworthy to access the portion of the target system, the validation operation comprising:
querying, by the target system, the remote system for contextual information about the remote system; and
in response to the query, receiving, by the target system and from the remote system, the contextual information;
a security module, stored in the memory in the target system, that determines a trustworthiness of the remote request based at least in part on the received contextual information, and that grants to the remote system access to the portion of the target system based on determining that the remote request is trusted; and at least one physical processor that executes the request module, the validation module, and the security module.

10. The system of claim 9, wherein the target system and the remote system are Endpoint Protection and Response enabled (EDR-enabled) host systems.

11. The system of claim 10, wherein the target system includes an EDR agent.

12. The system of claim 11, wherein determining, by the security module, the trustworthiness of the remote request includes the security module interfacing with the EDR agent.

13. The system of claim 9,
further comprising determining, by the target system, a trustworthiness of the remote system based at least in part on the received contextual information; and
wherein granting access to the portion of the target system is further based on determining that the remote system is trusted.

14. The system of claim 9, wherein the contextual information identifies an action requested by the remote system in connection with the remote request, and supplemental data related to the action requested by the remote system in connection with the remote request.

15. The system of claim 9, wherein the remote request comprises at least one of:
a request to launch a process on the target system;
a request to access data stored on the target system;
a request to write data to the target system;
a request to transfer an executable to the target system; or
a request to transfer data from the target system to an additional device outside the enterprise network.

16. The system of claim 9, further comprising, based on determining, by the target system, that the remote request is not trusted, not granting, by the target system and to the remote system, access to the portion of the target system.

17. A non-transitory computer-readable medium comprising one or more computer-executable instructions that, when executed by at least one processor of a computing device, cause the computing device to:
receive, by a target system and from a remote system, a remote request for access to a portion of the target system, the target system and the remote system performing direct Peer-to-Peer (P2P) communications with one another within an enterprise network;
perform, by the target system directly with the remote system, a validation operation to determine whether the remote system is trustworthy to access the portion of the target system, the validation operation comprising:
querying, by the target system, the remote system for contextual information about the remote system; and
in response to the query, receiving, by the target system and from the remote system, the contextual information;
determine, by the target system, a trustworthiness of the remote request based at least in part on the received contextual information; and
based on determining that the remote request is trusted, grant, by the target system and to the remote system, access to the portion of the target system.

18. The non-transitory computer-readable medium of claim 17, wherein the target system and the remote system are Endpoint Protection and Response enabled (EDR-enabled) host systems.

* * * * *